(12) United States Patent
Raste et al.

(10) Patent No.: US 9,399,450 B2
(45) Date of Patent: Jul. 26, 2016

(54) METHOD AND SYSTEM FOR PROMOTING A UNIFORM DRIVING STYLE

(71) Applicant: Continental Teves AG & Co. oHG, Frankfurt (DE)

(72) Inventors: Thomas Raste, Oberursel (DE); Peter Lauer, Karben (DE); Alfred Eckert, Mainz-Hechtsheim (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 0 days.

(21) Appl. No.: 14/422,521

(22) PCT Filed: Aug. 23, 2013

(86) PCT No.: PCT/EP2013/067570
§ 371 (c)(1),
(2) Date: Feb. 19, 2015

(87) PCT Pub. No.: WO2014/029882
PCT Pub. Date: Feb. 27, 2014

(65) Prior Publication Data
US 2015/0197225 A1 Jul. 16, 2015

(30) Foreign Application Priority Data

Aug. 24, 2012 (DE) .......................... 10 2012 215 100

(51) Int. Cl.
*B60T 8/1755* (2006.01)
*B60W 40/109* (2012.01)
(Continued)

(52) U.S. Cl.
CPC ......... *B60T 8/17554* (2013.01); *B60T 8/17558* (2013.01); *B60W 10/06* (2013.01);
(Continued)

(58) Field of Classification Search
CPC ............ B60T 8/17554; B60T 8/17558; B60T 2201/09; B60T 2201/16; B60T 2210/12; B60T 2210/24; B60T 2220/02; B60W 40/109; B60W 50/085; B60W 50/14; B60W 10/06; B60W 10/184; B60W 30/18136; B60W 2420/42; B60W 2420/52; B60W 2420/62; B60W 2520/10; B60W 2520/125; B60W 2520/146; B60W 2520/148; B60W 2520/402; B60W 2720/10; B60W 2720/106; B60W 2720/125
USPC ........................................................... 701/72
See application file for complete search history.

(56) References Cited

U.S. PATENT DOCUMENTS 6,343,253 B1   1/2002   Matsuura
7,774,121 B2   8/2010   Lee
(Continued)

FOREIGN PATENT DOCUMENTS

DE   10225892   1/2004
DE   10242124   3/2004
(Continued)

OTHER PUBLICATIONS

German Search Report mailed May 8, 2013 for German Application No. 10 2012 215 100.1.
International Search Report for International Application No. PCT/EP2013/067570 mailed Dec. 9, 2013.

*Primary Examiner* — Richard Camby
(74) *Attorney, Agent, or Firm* — RatnerPrestia

(57) ABSTRACT

A method and system for promoting a uniform driving style. A longitudinal speed of a motor vehicle and a route section curvature radius lying ahead of the vehicle are determined when the vehicle approaches the route section. An expected lateral acceleration is determined from the curvature radius and longitudinal speed as the route section is driven through. The lateral acceleration is compared with a permanently predefined lateral acceleration limiting value which can be predefined by the driver. In the event the expected lateral acceleration is greater than at least one of the lateral acceleration limiting values, the longitudinal speed is lowered by an optical, acoustic and/or haptic request to the driver and/or by autonomous braking intervention. If the expected lateral acceleration is smaller than or equal to the lower of the two lateral acceleration limiting values the lowering of the longitudinal speed is reduced by decreasing the engine drag torque.

12 Claims, 2 Drawing Sheets

(51) Int. Cl.
*B60W 50/08* (2012.01)
*B60W 50/14* (2012.01)
*B60W 10/06* (2006.01)
*B60W 10/184* (2012.01)
*B60W 30/18* (2012.01)

(52) U.S. Cl.
CPC ...... *B60W 10/184* (2013.01); *B60W 30/18136* (2013.01); *B60W 40/109* (2013.01); *B60W 50/085* (2013.01); *B60W 50/14* (2013.01); *B60T 2201/09* (2013.01); *B60T 2201/16* (2013.01); *B60T 2210/12* (2013.01); *B60T 2210/24* (2013.01); *B60T 2220/02* (2013.01); *B60W 2420/42* (2013.01); *B60W 2420/52* (2013.01); *B60W 2420/62* (2013.01); *B60W 2520/10* (2013.01); *B60W 2520/125* (2013.01); *B60W 2550/146* (2013.01); *B60W 2550/148* (2013.01); *B60W 2550/402* (2013.01); *B60W 2720/10* (2013.01); *B60W 2720/106* (2013.01); *B60W 2720/125* (2013.01)

(56) References Cited

U.S. PATENT DOCUMENTS

| | | | |
|---|---|---|---|
| 9,043,115 B2 * | 5/2015 | Schuberth | B60W 30/143 701/70 |
| 9,168,832 B2 * | 10/2015 | Ham | B60K 31/0066 |
| 2007/0021887 A1 | 1/2007 | Hofmann | |
| 2010/0100281 A1 | 4/2010 | Huang | |
| 2014/0222272 A1 | 8/2014 | Raste | |

FOREIGN PATENT DOCUMENTS

| | | |
|---|---|---|
| DE | 102005033995 | 2/2007 |
| DE | 102005040791 | 3/2007 |
| DE | 60035319 | 2/2008 |
| DE | 102007031542 | 1/2009 |
| DE | 102008035115 | 4/2009 |
| DE | 102009041580 | 4/2010 |
| DE | 102009000397 | 7/2010 |
| DE | 102012212616 | 1/2013 |
| EP | 1805530 | 7/2007 |
| JP | 2009101830 | 5/2009 |

* cited by examiner

METHOD AND SYSTEM FOR PROMOTING A UNIFORM DRIVING STYLE

CROSS REFERENCE TO RELATED APPLICATIONS

This application is the U.S. National Phase Application of PCT International Application No. PCT/EP2013/067570, filed Aug. 23, 2013, which claims priority to German Patent Application No. 10 2012 215 100.1, filed Aug. 24, 2012, the contents of such applications being incorporated by reference herein.

FIELD OF THE INVENTION

The invention relates to a method for promoting a uniform driving style and a system for promoting a uniform driving style.

BACKGROUND OF THE INVENTION

In the prior art a number of different sensor systems for detecting the surroundings are already known. Using said sensor systems it is possible for example to draw conclusions about the road conditions, to determine the distance to a vehicle ahead and also to detect the occurrence of hazardous situations. Likewise, the use of global satellite navigation systems in conjunction with digital map material in motor vehicles is known, for example for route guidance or even for warning the driver if he is approaching a tight turn at excessive speed. Finally, it is known to carry out autonomous interventions into the control of the vehicle for hazard prevention, in particular into the vehicle brake system, on the basis of the recorded environment sensor data and the digital map material.

In this context DE 10 2009 041 580 A1, which is incorporated by reference, discloses a method for predictive warning of turns. According to DE 10 2009 041 580 A1, for this purpose a turn profile is detected by means of environment sensors such as, for example, radiation sensors or camera sensors, and is compared with a turn profile based on digital map information. A turn verification signal is produced from the comparison that gives the determined differences of the detected turn profile and the turn profile based on the map information. Depending on the turn verification signal, the position and the speed of the vehicle, a turn warning signal can be produced and output in order to warn the driver or to cause a deliberate deceleration of the vehicle by means of an intervention in the control of the vehicle.

A method for increasing driving safety or the comfort of a motor vehicle is known from EP 1 805 530 B1, which is incorporated by reference, with which data of a vehicle controller provided for controlling a safety enhancing function is logically combined with data of a navigation device or with cartographic data. The cartographic data are used here together with information about the current driving conditions detected by sensors directly or indirectly in the vehicle to determine a current hazard value. Depending on the hazard value, interventions in the function groups with safety enhancing functions can take place, wherein in particular a visual, audible or haptic warning is given to the driver of the vehicle in addition to or instead of the intervention.

In the unpublished DE 10 2012 212 616.3, which is incorporated by reference, a method for improving the driving stability is disclosed. If it is predicted that a critical driving situation is to be expected using route information based on digital map data and position data based on GPS data, in particular because of an approach at excessive speed to a turn ahead, then a braking intervention that is independent of the driver is triggered. The prediction is based in this case on information about the maximum usable coefficient of friction that is specified by the driver by means of a man-machine interface. Moreover, a required coefficient of friction is determined using one or more driving condition variables, the route information and the current position data. Said required coefficient of friction is provided to the driver together with information about the coefficient of friction to be anticipated.

SUMMARY OF THE INVENTION

However, it is a disadvantage of the method known from the prior art that the known interventions into the control of the vehicle take place exclusively in a safety-oriented manner and without taking into account the promotion or at least maintenance of a uniform and fluid driving style.

Therefore an aspect of the invention proposes a method that carries out interventions into the control of the vehicle not in an exclusively safety-oriented manner.

According to the method according to an aspect of the invention for promoting a uniform driving style, with which a longitudinal speed of a motor vehicle and a radius of curvature of a segment of route ahead of the motor vehicle are determined when the motor vehicle is approaching the route segment, wherein a lateral acceleration to be expected when driving through the route segment is determined from the turn radius and the longitudinal speed, and said lateral acceleration to be expected is compared with a fixed specified lateral acceleration limit value and/or with a lateral acceleration limit value that can be specified by the driver, a deceleration of the longitudinal speed is carried out in the case in which the lateral acceleration to be expected exceeds at least one of the lateral acceleration limit values by means of a visual and/or audible and/or haptic request to the driver and/or by means of an autonomous braking intervention until the lateral acceleration to be expected reaches the lower of the two lateral acceleration limit values. The method according to the invention is characterized in that the deceleration of the longitudinal speed is reduced by means of an engine drag torque reduction in the case in which the lateral acceleration to be expected is less than or equal to the lower of the two lateral acceleration limit values.

The method according to the invention thus enables not only both a uniform and also an energy-saving and thus environmentally friendly driving manner, but also contributes to increasing driving safety, because an autonomous braking intervention for deceleration of the vehicle may be provided in order to prevent a critical lateral acceleration from occurring when driving through the route segment comprising the turn radius.

The physical variable referred to with the term "lateral acceleration to be expected" within the context of the invention is in the simplest case that lateral acceleration that arises by computation from the radius of curvature and the current longitudinal speed of the motor vehicle. Preferably, however, more complex models can be used as a basis, which enable a prediction of a probable longitudinal speed at the point in time of driving through the route segment comprising the radius of curvature. In this case it is particularly preferred that the probable longitudinal speed is used for determining the lateral acceleration to be expected.

If only a fixed specified lateral acceleration limit value and no lateral acceleration limit value specified by the driver is available, the fixed specified lateral acceleration limit value from the method according to the invention is adopted as the lower of the two lateral acceleration limit values. The lateral acceleration limit value specified by the driver can be set to infinity in this case for example.

The fixed specified lateral acceleration limit value is preferably selected according to driving safety aspects such that it still just prevents departure of the motor vehicle from the carriageway or skidding of the vehicle because of the lateral control forces of the vehicle tires being too low for the lateral acceleration to be expected. Thus in general the fixed specified lateral acceleration limit value is greater than the lateral acceleration limit value specifiable by the driver. It is particularly preferred if the driver is not given the option of specifying a lateral acceleration limit value that is greater than the fixed specified lateral acceleration limit value.

It is preferably provided that the lateral acceleration limit value specifiable by the driver can be specified by means of a man-machine interface, wherein the lateral acceleration limit value specifiable by the driver can be indirectly specified by the selection of a driving style that is by preferred by the driver. This gives the advantage that the driver is not confronted with numerical values that are incomprehensible for him, whose selection and specification as a lateral acceleration limit value generally result in an unforeseeable result for most drivers, because they do not generally have the necessary previous technical training that is necessary for the assessment of a lateral acceleration value. Instead of this, selection options are proposed to the driver with terms that are comprehensible for him, wherein the selection of one of the terms automatically causes the selection and specification of an associated lateral acceleration limit value. Examples of such an indirect selection of the lateral acceleration limit value using a term that is comprehensible to the driver are for example the specifications "sport", "normal" or "eco". The specification "sport" preferably corresponds here to a lateral acceleration value of 9 m/s$^2$, the specification "normal" preferably corresponds to a lateral acceleration value of 4 m/s$^2$ and the specification "eco" preferably corresponds to a lateral acceleration value of 2.5 m/s$^2$.

The man-machine interface can preferably be in the form of a display, particularly preferably of a touch screen, of a keyboard or in the form of a single button.

It is advantageously provided that the process is started if the driver does not operate a pedal and the process is terminated if the driver operates a pedal. A situation in which the driver does not carry out a pedal operation generally occurs if when approaching a turn or a vehicle ahead the driver is briefly undecided whether a reduction of the longitudinal speed is necessary or useful. In said phase of indecision of the driver, starting the process according to the invention can now take place, wherein the driver is in particular visually shown that the process has started and therefore the driver does not have to carry out further control of the longitudinal speed independently. A further advantage is that the process is not started while the driver is actively making an input to controlling the longitudinal speed. A superimposition of control inputs or even overriding the driver against his wishes is thus avoided. By carrying out a termination of the process if the driver carries out a pedal operation, it is also ensured that the driver can always resume full control over the vehicle.

Furthermore, it is preferable that the determination of the radius of curvature is carried out by means of camera sensors and/or by means of radar sensors and/or by means of lidar sensors and/or by means of laser sensors and/or by means of digital map material and a determination of the position of the motor vehicle. Said sensor types are suitable for detecting the surroundings including the determination of a radius of curvature for an approach by the vehicle to the route segment comprising the radius of curvature. If a plurality of said sensor types are available in the motor vehicle, the determination of a radius of curvature can be carried out redundantly and reliably. A determination of the radius of curvature by means of digital map material and the position of the motor vehicle also brings the advantage that a high proportion of current motor vehicles are already fitted with position determination devices, for example based on GPS, and with digital map material for route guidance. A cost-causing additional equipment expenditure is not necessary in this case.

In particular, it is preferable that the determination of the position of the motor vehicle is carried out by means of a global satellite navigation system and/or by means of a map matching process. Many current motor vehicles already comprise position determination devices based on GPS for example, which keeps the implementation costs for the method according to the invention low in said motor vehicles. The determination of the position by means of a map matching process additionally or alternatively enables recorded environment data, such as, for example, a tunnel entrance, a tight turn or a characteristic road crossing, to be compared with digital map material, which also describes environment data, and the current position of the motor vehicle to be fitted into in map data using the matching.

Moreover, it is advantageous that the deceleration of the longitudinal speed achieved by the autonomous braking intervention does not exceed a specified deceleration limit value, in particular 3 m/s$^2$. In this way it is avoided that the method according to the invention provokes a rear-end collision by a sharp and possibly sudden deceleration process. If a higher deceleration appears necessary than the specified deceleration limit value permits, a corresponding warning or request can be output to the driver. The driver can then set a suitable high deceleration following an assessment of the present situation.

Moreover, it is advantageous that the segment of route ahead is selected from a plurality of possible route segments to be driven through by the motor vehicle by using data of a route planner. Thus in the case of the approach of the motor vehicle to a fork in the route it can also already be reliably detected in advance which segment of route will be driven through by the motor vehicle, which in turn enables the determination of the radius of curvature of said route segment in advance.

Furthermore, it is advantageous that when detecting that the lateral acceleration limit value is being exceeded, in particular the fixed specified lateral acceleration limit value, when driving through the route segment having the radius of curvature, passive safety means for the protection of vehicle occupants are activated, in particular one or a plurality of belt tensioners are activated. Exceeding the lateral acceleration limit value, in particular the fixed specified lateral acceleration limit value, can be an indication of a hazardous situation occurring at short notice, because for example the lateral control forces of the vehicle tires can be too low for the lateral acceleration to be expected. By predictive activation of passive safety means, the risk of injury for the driver and any other vehicle occupants in such a situation is reduced.

It is preferably provided that an estimation of the coefficient of friction is carried out, wherein the estimation of the coefficient of friction is used for a specification of the fixed specified lateral acceleration limit value. The estimation of the coefficient of friction can for example be carried out from the weather conditions or a previously conducted ABS or ESC control. Thus for example in the case of rain, in particular at low temperatures, a significantly reduced coefficient of friction is to be expected. Said circumstance can be taken into account by automatically adapting the fixed specified lateral acceleration limit value by the method according to the invention.

Moreover, it is provided that a vehicle ahead of the motor vehicle is detected by means of the camera sensors and/or by means of the radar sensors and/or by means of the lidar sensors and/or by means of the laser sensors and a distance to and a speed difference relative to the vehicle ahead are determined, wherein in the case in which the motor vehicle is approaching the vehicle ahead and in doing so the distance will probably be below a normal traffic safety distance, a deceleration of the longitudinal speed is carried out by means of a visual and/or audible and/or haptic request to the driver or by means of an autonomous braking intervention, so that the motor vehicle is not likely to fall below the normal traffic safety distance to the vehicle ahead and wherein the longitudinal acceleration is reduced by means of an engine drag torque reduction in the case in which the motor vehicle is no longer approaching the vehicle ahead and/or the distance to the vehicle ahead is increasing. This gives the advantage that the method according to the invention also comes into use advantageously on detecting a vehicle ahead of the motor vehicle. Within the scope of the invention, this constitutes a situation analogous to driving through a route segment comprising the radius of curvature. The analogy of the two situations is that in both cases the driver has to estimate with which approach behavior he wants to approach the route segment comprising the radius of curvature or the vehicle ahead. The method according to the invention for promoting a uniform driving style can be of assistance during this.

An aspect of the present invention further relates to a system for promoting a uniform driving style that comprises a motor vehicle and camera sensors and/or radar sensors and/or lidar sensors and/or laser sensors and/or position determination means and/or an electronic memory comprising digital map material. Furthermore, the system comprises means for the determination of a longitudinal speed of the motor vehicle and passive vehicle occupant safety means and means for the determination of a radius of curvature of a route segment ahead of the motor vehicle and a gas pedal and a brake pedal for adjusting a longitudinal speed of the motor vehicle. Moreover, the system comprises weather condition sensors and means for the estimation of the coefficient of friction and means for the determination of a lateral acceleration to be expected when driving through the route segment and comparison means for comparing the lateral acceleration to be expected with a fixed specified lateral acceleration limit value and with a lateral acceleration limit value specifiable by the driver. Finally, the system comprises means for making a visual and/or audible and/or haptic request to the driver for the deceleration of the longitudinal speed and/or braking intervention means for autonomous deceleration of the longitudinal speed and means for engine drag torque reduction. The system is characterized in that it implements the method according to the invention. The system according to the invention thus comprises all necessary means for implementation of the method according to the invention and results in the advantages that have already been described through the implementation of the method according to the invention.

The weather condition sensors can be implemented here for example as a rain sensor or temperature sensor or a radio receiver or other suitable cable-less data receivers for receiving weather data.

BRIEF DESCRIPTION OF THE DRAWINGS

Further preferred embodiments are revealed in the dependent claims and the following description of an exemplary embodiment using figures.

In the figures

DETAILED DESCRIPTION OF THE PREFERRED EMBODIMENTS

Figure 1:
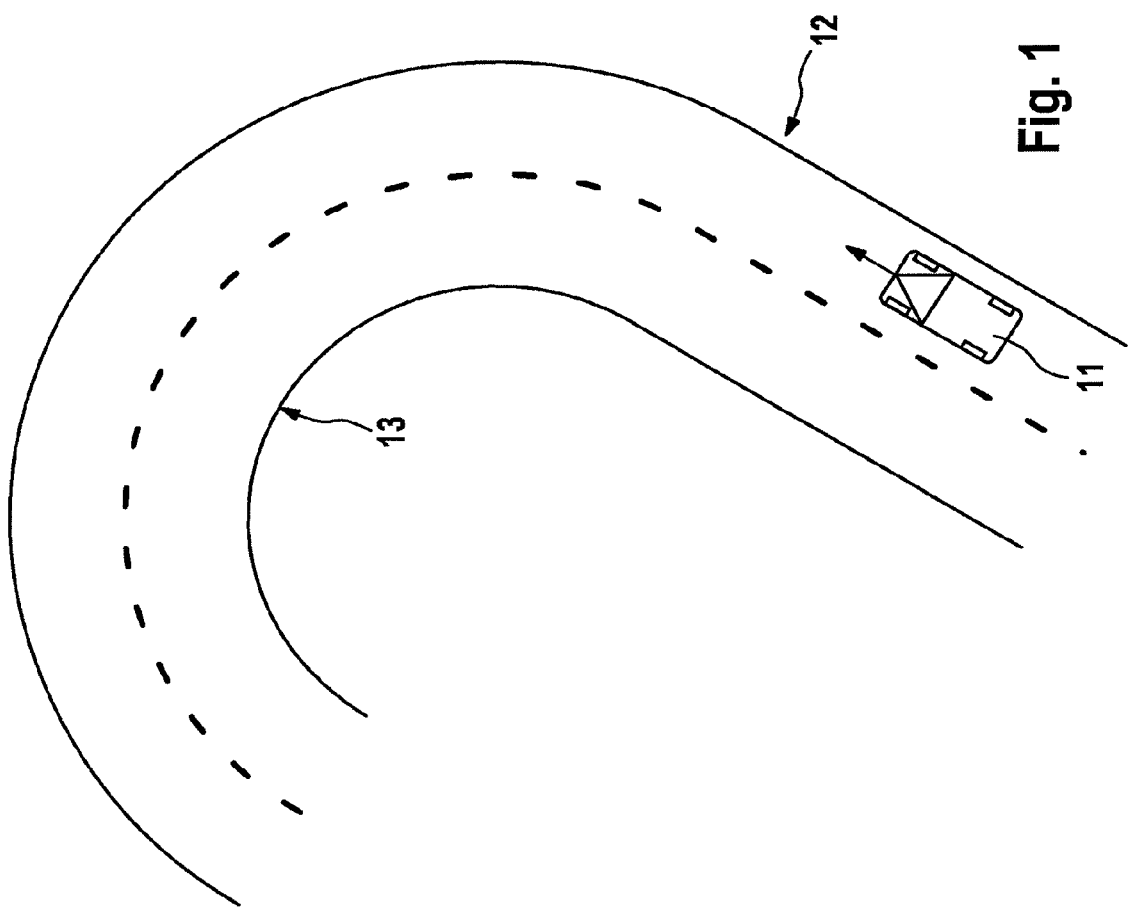
FIG. 1 shows a motor vehicle that is approaching a segment of route comprising a radius of curvature.

FIG. 1 shows a motor vehicle 11, which is approaching a segment of route 13 comprising a radius of curvature on road 12. Motor vehicle 11 is fitted with the system according to the invention for promoting a uniform driving style. Determination of the position of motor vehicle 11 is carried out by means of a GPS receiver in motor vehicle 11 and it is identified by means of digital map material present in motor vehicle 11 that motor vehicle 11 is approaching a segment of route 13 comprising a radius of curvature. At the same time, the radius of curvature of the route segment 13 is determined from the digital map material. The radius of curvature determined by means of the digital map material is verified below by camera sensors present in motor vehicle 11. A lateral acceleration to be expected is determined from the radius of curvature that is known in this way and the current longitudinal speed. The determination of the lateral acceleration is based here on the relationship (lateral acceleration=[longitudinal speed]$^2$/radius of curvature). Because when approaching a segment of route 13 the driver is initially undecided regarding the longitudinal speed to be selected and there is no pedal operation for a brief period of time, the implementation of the method according to the invention in motor vehicle 11 is started automatically. This is indicated to the driver by means of a visual display in the instrument panel. The method according to the invention first compares the lateral acceleration to be expected with a lateral acceleration limit value. The lateral acceleration limit value used for the comparison is a lateral acceleration limit value specified by the driver, which limits a maximum lateral acceleration to 2.5 m/s$^2$ and which is lower than the fixed specified lateral acceleration limit value 10 m/s$^2$. The driver has already specified said specification before starting out by having selected the driving style "eco". Using the comparison, the system now recognizes that no further deceleration of the longitudinal speed is necessary because the lateral acceleration to be expected is somewhat lower than the lateral acceleration limit value specified by the driver. Therefore the system reduces the deceleration of the longitudinal speed by means of engine drag moment control in order to thereby avoid a further unnecessary reduction of the longitudinal speed of motor vehicle 11. Once motor vehicle 11 has driven through the route segment 13, full control of the vehicle is returned to the driver. For this purpose a pedal operation is requested by means of a visual display and an audible buzzer, whereupon the implementation of the process according to the invention is ended.

Figure 2:
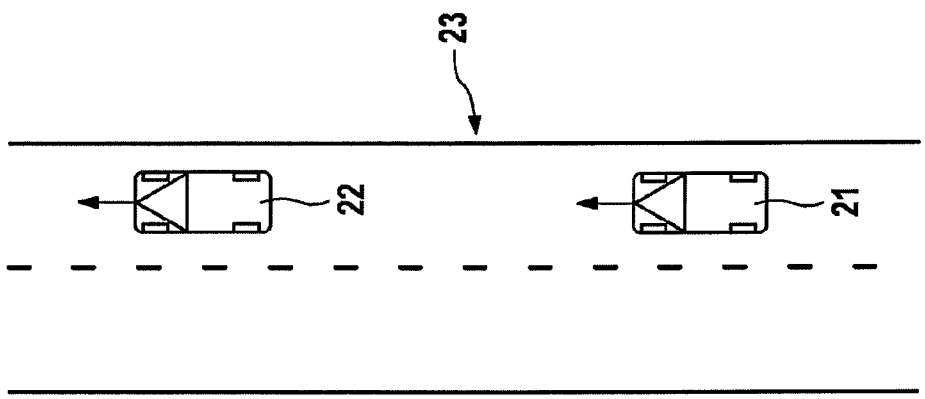
FIG. 2 shows a motor vehicle that is approaching a vehicle ahead of the motor vehicle and FIG. 3 shows an exemplary design of a system according to the invention.

In FIG. 2 motor vehicle 21 is illustrated, which comprises the system according to the invention for promoting a uniform driving style and is approaching vehicle 22 on road 23. By means of radar sensors the system according to the invention in motor vehicle 21 determines both the distance to vehicle 22 and also the difference in speed relative to vehicle 22. During this it is detected that for an unchanged speed of motor vehicle 21 the distance from motor vehicle 21 to vehicle 22 is likely to fall below a normal traffic safety distance. Because the driver of motor vehicle 21 is briefly made uncertain by the rapid approach to vehicle 22, he does not carry out a pedal operation. Because of this the system according to the invention is activated and starts the implementation of the method according to the invention. This outputs a visual request to the driver to reduce the longitudinal speed of motor vehicle 21. However, because the driver does not respond and the distance to vehicle 22 continues to reduce such that it is further likely to fall below a normal traffic safety distance, finally an autonomous braking intervention is carried out in order to avoid a critical traffic situation.

Figure 3:
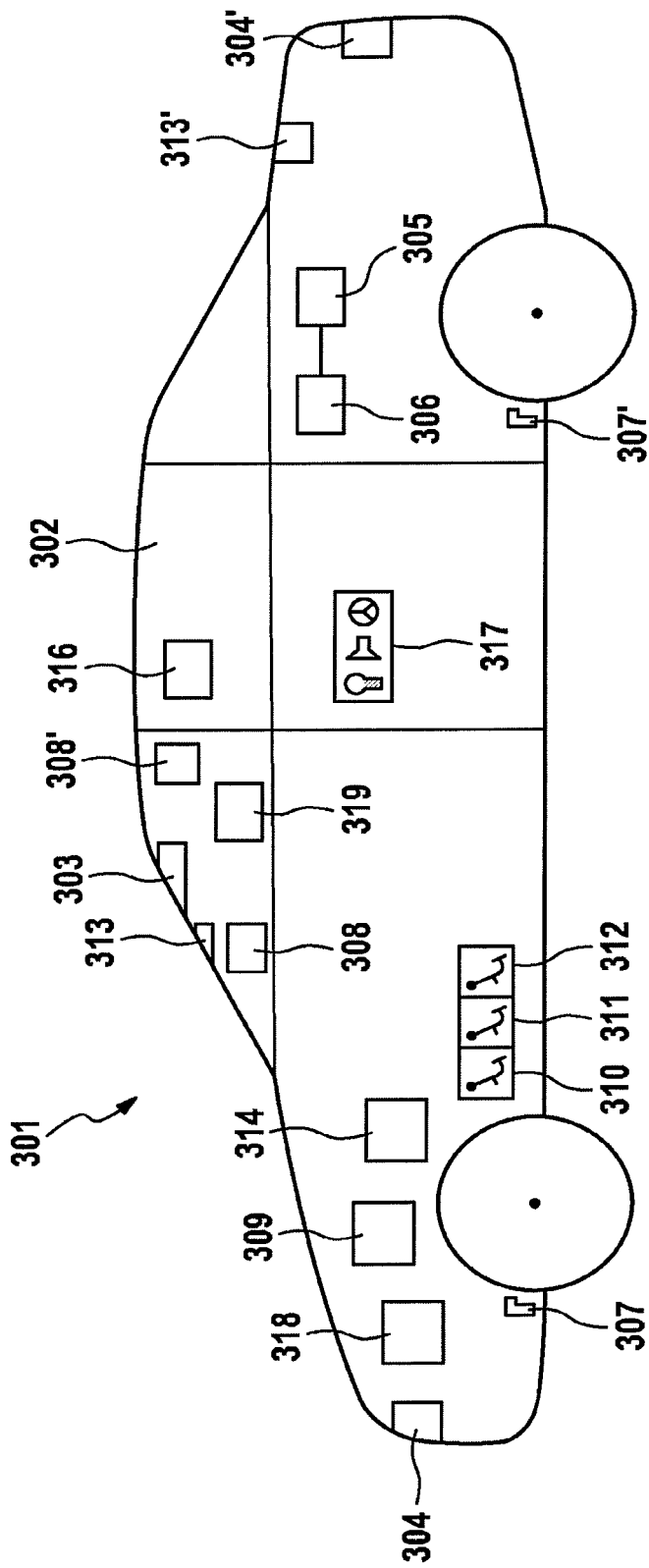

FIG. 3 shows a possible embodiment of system 301 according to the invention for promoting a uniform driving style. System 301 comprises motor vehicle 302 and a plurality of further elements, according to the example comprised by motor vehicle 302. Said elements are camera sensing means 303 in the form of a stereo camera, radar sensors 304 and 304' in the form of a frontward-oriented radar sensor and of a rearward facing radar sensor, an electronic memory 305, which comprises digital map material and which is coupled to position determination means 306 in the form of GPS receivers at the data level, wherein the electronic memory 305 and the position determination means 306 together fulfill the function of a route planner and route guidance means. Furthermore, system 301 comprises means for the determination of a longitudinal speed of the motor vehicle 307 and 307' in the form of ABS revolution rate sensors, passive safety means for the protection of vehicle occupants 308 and 308' in the form of an airbag and of a belt tensioner, means for the determination of a radius of curvature of a route segment ahead of the motor vehicle 309 in the form of an electronic computer module, a gas pedal 310, a brake pedal 311, a clutch pedal 312 and a man-machine interface 319 in the form of a touch screen. Finally, the system comprises weather condition sensors 313 and 313' in the form of a rain sensor and of an external temperature sensor, means for the estimation of the coefficient of friction 316 in the form of a further electronic computer module, means for the determination of a lateral acceleration to be expected 309, which are integrated within the electronic computer module of the means for the determination of a radius of curvature 309, because the electronic computer module comprises sufficient computing capacity for a number of uses, comparison means 309 for comparing the lateral acceleration to be expected with a fixed specified lateral acceleration limit value and with a lateral acceleration limit value specifiable by the driver, which is also integrated within the electronic computer module of the means for the determination of a turn radius 309, means for making a visual, audible and haptic request 317, which are implemented in the form of a display, a connection to the loudspeaker system of motor vehicle 302 and of a vibration generator integrated within the steering wheel and braking intervention means 318 in the form of an ESC system and means for engine drag torque reduction 314 in the form of an electronic throttle control.

The invention claimed is:

1. A method for promoting a uniform driving style,
   determining, by a processor in a control system of a motor vehicle, a longitudinal speed of the motor vehicle and a radius of curvature of a route segment ahead of the motor vehicle when the motor vehicle is approaching the route segment,
   determining, by the processor, a lateral acceleration to be expected when driving through the route segment from the radius of curvature and the longitudinal speed of the motor vehicle, and
   comparing, by the processor, the lateral acceleration of the motor vehicle to be expected with a first fixed specified lateral acceleration limit value and with a second lateral acceleration limit value specifiable by the driver,
   in the case in which the lateral acceleration to be expected is greater than at least one of the first and second lateral acceleration limit values, the processor reduces the longitudinal speed of the motor vehicle by at least one of:
     i) making a visual request to the driver,
     ii) making an audible request to the driver,
     iii) making a haptic request to the driver, and
     iv) initiating autonomous braking,
   until the lateral acceleration to be expected is less than or equal to a lower one of the first and second lateral acceleration limit values, and
   in the case in which the lateral acceleration to be expected is less than or equal to the lower of the first and second lateral acceleration limit values, the processor reduces the deceleration of the longitudinal speed of the motor vehicle by reducing an engine drag torque.

2. The method as claimed in claim 1, wherein
   the lateral acceleration limit value specifiable by the driver can be specified by a man-machine interface, wherein the lateral acceleration limit value specifiable by the driver can be specified indirectly by the selection of a driving style preferred by the driver.

3. The method as claimed in claim 1, wherein
   implementation of the method is started if the driver does not carry out a pedal operation and termination of implementation of the method takes place if the driver carries out a pedal operation.

4. The method as claimed in claim 1, wherein
   the determination of the radius of curvature takes place by camera sensors and/or by radar sensors and/or by lidar sensors and/or by laser sensors and/or by digital map material and a determination of the position of the motor vehicle.

5. The method as claimed in claim 4, wherein
   the determination of the position of the motor vehicle takes place by means of a global satellite navigation system and/or by a map matching process.

6. The method as claimed in claim 1, wherein
   the deceleration of the longitudinal speed achieved by the autonomous braking intervention does not exceed a specified deceleration limit value, in particular 3 m/s$^2$.

7. The method as claimed in claim 1, wherein
   the route segment ahead is selected from a number of possible route segments to be driven through by the motor vehicle by the data of a route planner.

8. The method as claimed in claim 1, wherein
   on detecting that the lateral acceleration limit value is exceeded, in particular the fixed specified lateral acceleration limit value, when driving through the route segment comprising the radius of curvature, passive safety means for the protection of vehicle occupants are activated, in particular one or a plurality of belt tensioners is/are activated.

9. The method as claimed in claim 1, wherein
   an estimation of the coefficient of friction is carried out, wherein the estimate of the coefficient of friction is used as a basis for a specification of the fixed specified lateral acceleration limit value.

10. The method as claimed in claim 1, wherein
    by the camera sensors and/or by the radar sensors and/or by the lidar sensors and/or by the laser sensors a vehicle ahead of the motor vehicle is detected and a distance to and a speed difference relative to said vehicle are determined, wherein in the case in which the motor vehicle is approaching the vehicle ahead and during this it is likely that the distance will fall below a normal traffic safety distance, a deceleration of the longitudinal speed is carried out by a visual and/or audible and/or haptic request to the driver or by an autonomous braking intervention, so that the motor vehicle is not likely to fall below the normal traffic safety distance to the vehicle ahead and wherein in the case in which the motor vehicle is no longer approaching the vehicle ahead and/or the distance to the vehicle ahead is increasing, the longitudinal acceleration is reduced by means of an engine drag torque reduction.

11. A system for promoting a uniform driving style, comprising a motor vehicle and camera sensors and/or radar sensors and/or lidar sensors and/or laser sensors and/or position determination means and/or an electronic memory comprising digital map material and means for the determination of a longitudinal speed of the motor vehicle and passive safety means for the protection of vehicle occupants and means for the determination of a radius of curvature of a route segment ahead of the motor vehicle and a gas pedal and a brake pedal for adjusting a longitudinal speed of the motor vehicle and a man-machine interface and weather condition sensors and means for the estimation of the coefficient of friction and means for the determination of a lateral acceleration to be expected when driving through the route segment and comparison means for comparing the lateral acceleration to be expected with a fixed specified lateral acceleration limit value and with a lateral acceleration limit value specifiable by the driver and means for making a visual and/or audible and/or haptic request to the driver for deceleration of the longitudinal speed and/or braking intervention means for the autonomous deceleration of the longitudinal speed and means for engine drag torque reduction, wherein the system implements a method as claimed in claim 1.

12. The method as claimed in claim 1, wherein on detecting that the fixed specified lateral acceleration limit value is exceeded when driving through the route segment comprising the radius of curvature one or a plurality of belt tensioners is/are activated.

\* \* \* \* \*